(12) United States Patent
Cortazzo et al.

(10) Patent No.: US 12,127,539 B2
(45) Date of Patent: Oct. 29, 2024

(54) RAPIDLY ADJUSTABLE BAIT PROTECTOR

(71) Applicant: UNICORN SQUAD, INC., Wilmington, DE (US)

(72) Inventors: Daniel Cortazzo, Santa Cruz, CA (US); Evin Gamal Prather, Redondo Beach, CA (US); Christian Hamilton, Santa Cruz, CA (US)

(73) Assignee: UNICORN SQUAD, INC., Wilmington, DE (US)

( * ) Notice: Subject to any disclaimer, the term of this patent is extended or adjusted under 35 U.S.C. 154(b) by 0 days.

(21) Appl. No.: 17/556,838

(22) Filed: Dec. 20, 2021

(65) Prior Publication Data

US 2023/0189774 A1 Jun. 22, 2023

(51) Int. Cl.
*A01K 83/06* (2006.01)

(52) U.S. Cl.
CPC .................... *A01K 83/061* (2022.02)

(58) Field of Classification Search
CPC ....... A01K 83/061; A01K 83/06; A01K 97/00
See application file for complete search history.

(56) References Cited

U.S. PATENT DOCUMENTS

| | | | | |
|---|---|---|---|---|
| 2,467,971 A * | 4/1949 | Frair | ...................... | A01K 83/06 43/42.22 |
| 2,736,124 A * | 2/1956 | Wittmann, Jr. | ........ | A01K 85/16 43/42.22 |
| 2,763,086 A * | 9/1956 | Johnson | .................. | A01K 83/06 43/44.2 |
| 3,197,911 A * | 8/1965 | Rolfsness | ............... | A01K 83/06 43/44.2 |
| 3,205,608 A * | 9/1965 | Dickinson | ............... | A01K 85/16 43/42.49 |
| 3,645,031 A * | 2/1972 | Egles | ...................... | A01K 83/06 43/44.2 |
| 4,067,135 A * | 1/1978 | Martin | .................... | A01K 83/06 43/44.2 |
| 4,133,132 A | 1/1979 | Ellis et al. | | |

(Continued)

FOREIGN PATENT DOCUMENTS

GB 2466696 A * 7/2010 ............. A01K 83/00

OTHER PUBLICATIONS

Haymond, Bill, "The Science of Salmon Fishing", A Guide to Saltwater Fishing in the Pacific Northwest (5 pages), published Jan. 4, 2020.

*Primary Examiner* — Peter M Poon
*Assistant Examiner* — Carly W. Lynch
(74) *Attorney, Agent, or Firm* — ARC IP Law, PC; Joseph J. Mayo

(57) ABSTRACT

The invention relates to a bait protector for bait fish that enables rapid adjustment of line position and bait shape without restringing the line or replacing hooks. The protective head comprises the line that runs through a plug that fits into any of several different holes in a front of the bait protector, such that using the several different holes changes the spin of the bait. To change holes, the plug is removed from its hole by sliding it along the line, the line is shifted to another hole along slots that connect the holes, and the plug is reinserted into the new hole without rerigging the bait. The bait protector includes a tuning wire that is inserted through the front and into the bait, and the tuning wire can be bent to shape the bait as desired.

20 Claims, 9 Drawing Sheets

(56) References Cited

U.S. PATENT DOCUMENTS

| | | | | |
|---|---|---|---|---|
| 5,887,378 A * | 3/1999 | Rhoten | ................. | A01K 85/14 |
| | | | | 43/42.23 |
| 9,044,000 B1 | 6/2015 | Lumsden | | |
| 11,140,884 B2 * | 10/2021 | Wedam | ................. | A01K 85/18 |
| 2004/0010959 A1 * | 1/2004 | Kress | .................... | A01K 83/06 |
| | | | | 43/44.4 |
| 2018/0098529 A1 * | 4/2018 | de Sousa | ............... | A01K 83/06 |
| 2019/0082666 A1 * | 3/2019 | Copeland | ............... | A01K 95/00 |

* cited by examiner

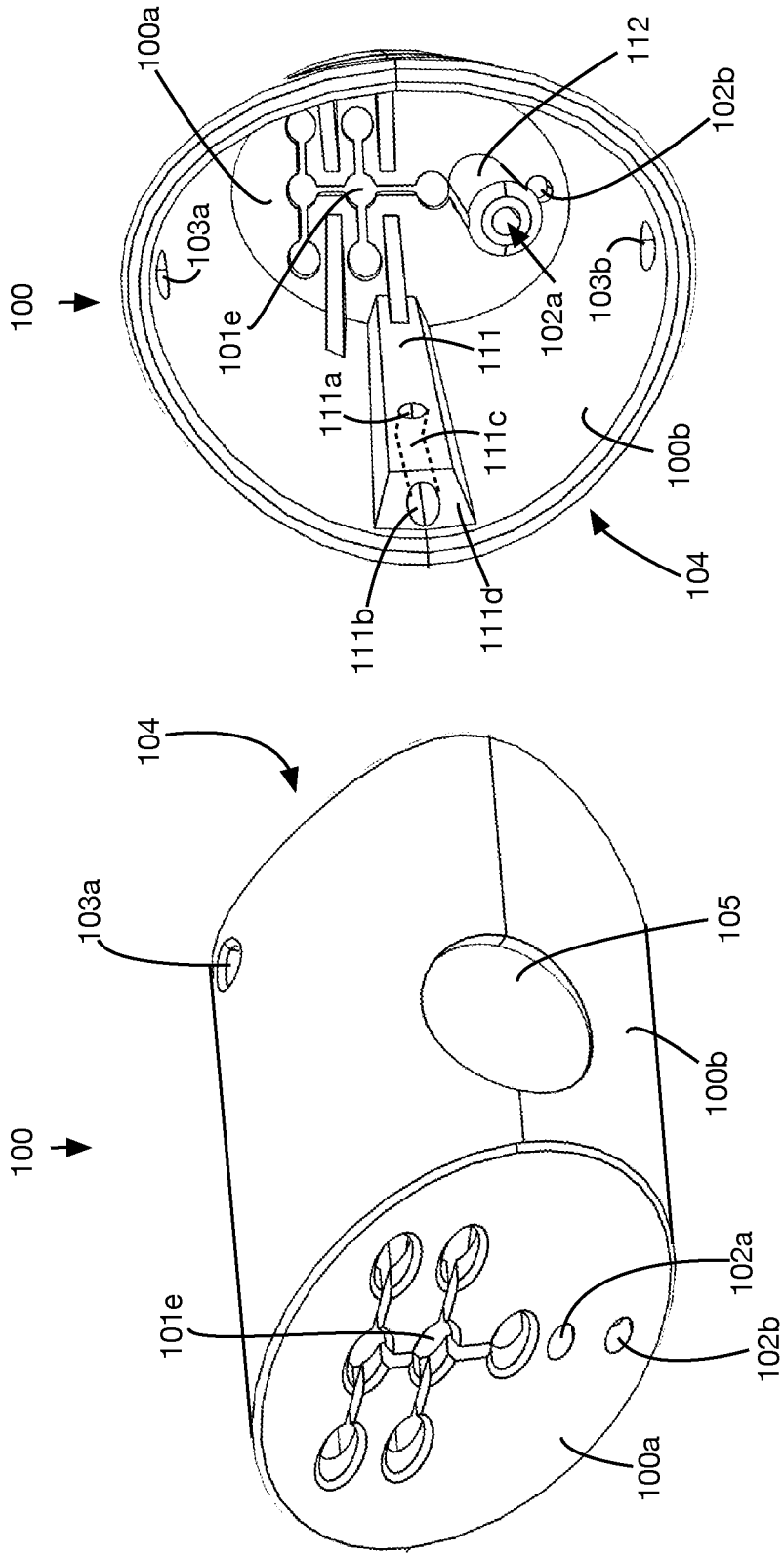

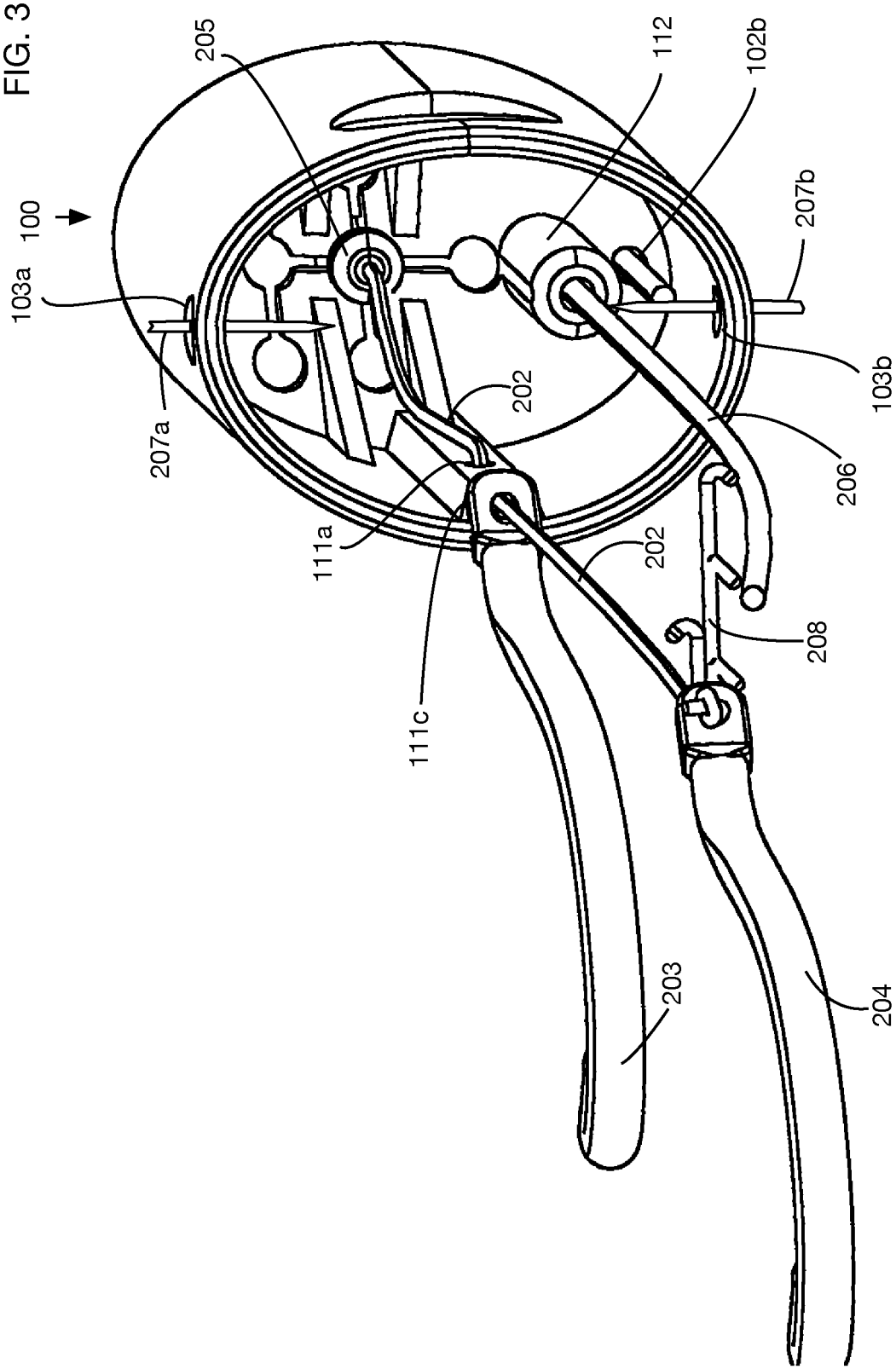

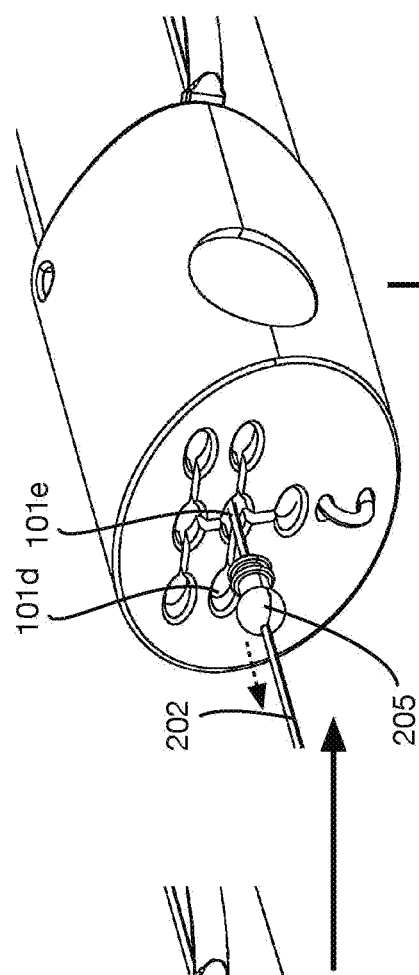
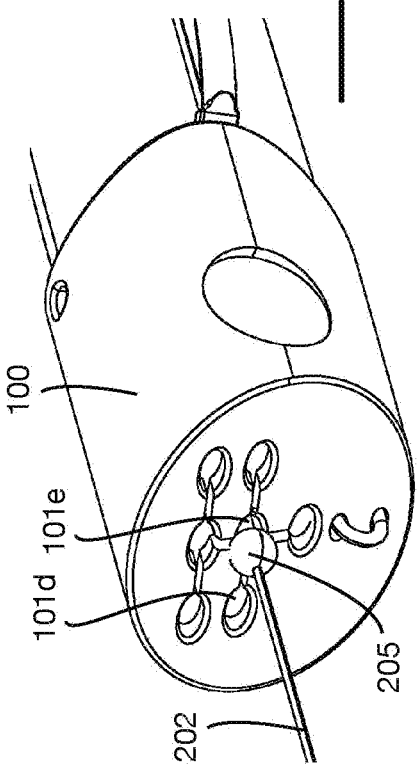
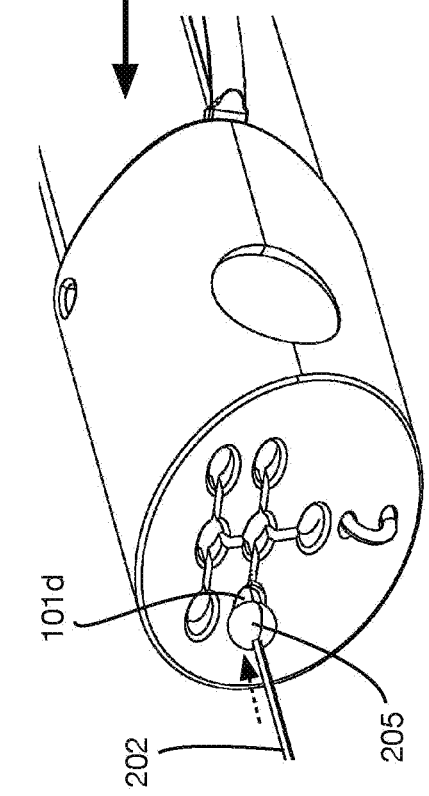
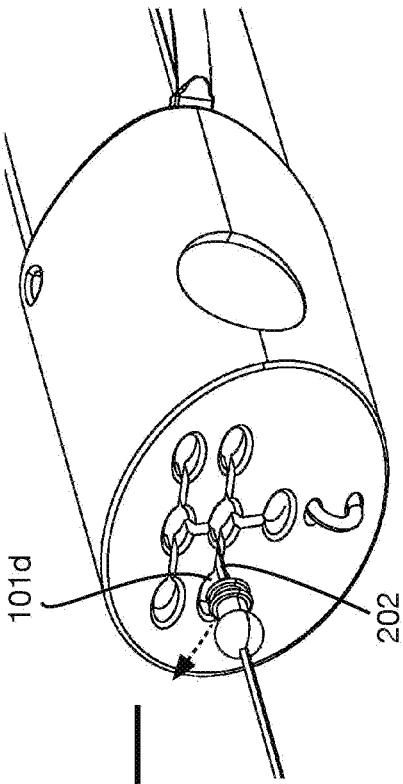

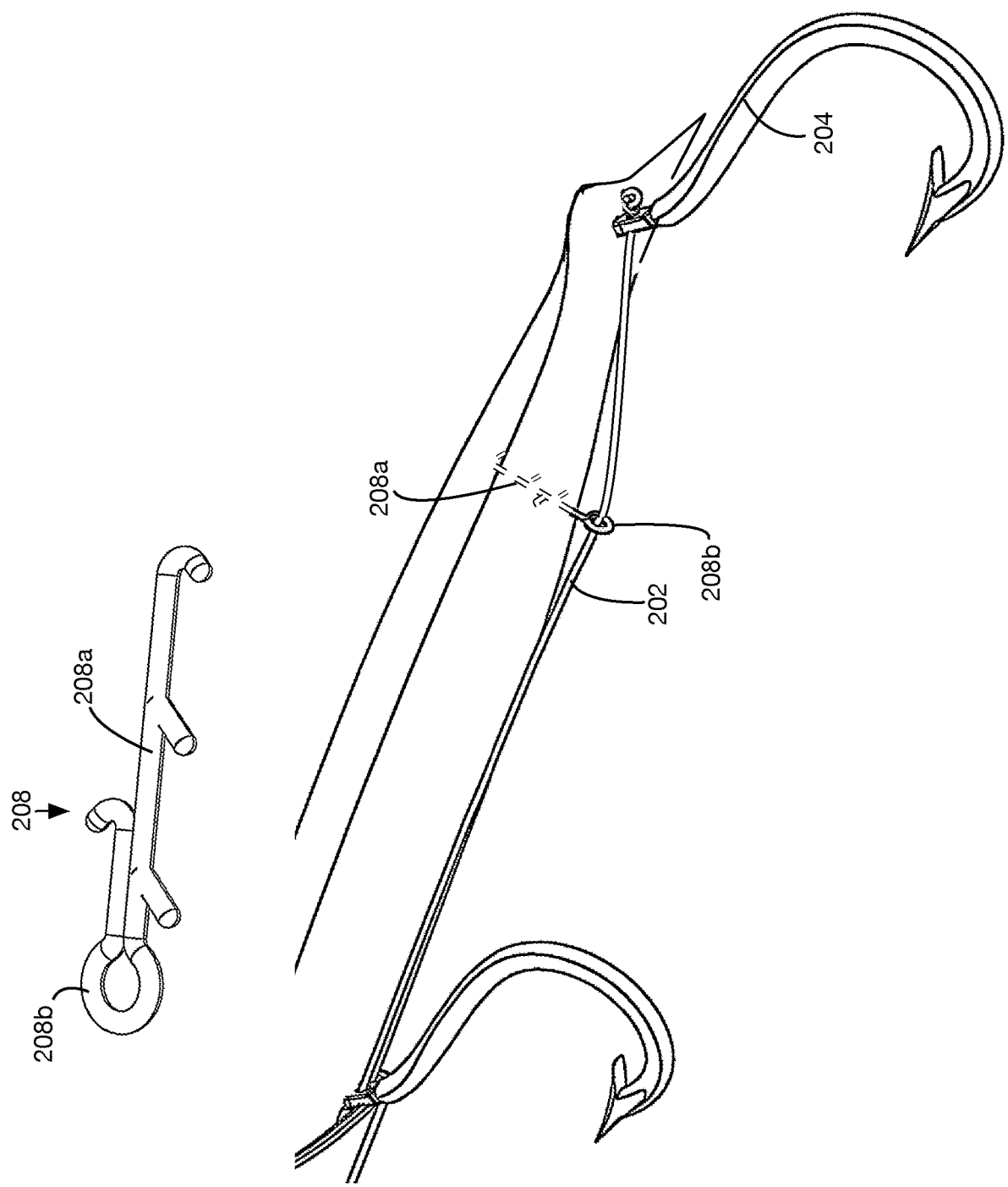

RAPIDLY ADJUSTABLE BAIT PROTECTOR

BACKGROUND OF THE INVENTION

Field of the Invention

One or more embodiments of the invention are related to the field of fishing equipment, specifically equipment for holding and attaching bait. More particularly, but not by way of limitation, one or more embodiments of the invention enable a rapidly adjustable bait protector.

Description of the Related Art

One very effective style of fishing is using a beveled cut to remove the head and entrails of a baitfish. Hooks are placed near the cut edge and tail of the bait. The resulting action mimics the erratic movement of wounded baitfish. This style of fishing is often referred to as "cut plug" or "plug cut" herring. This style of fishing is well-known for catching trophy fish. "Cut plugging" is a sophisticated fishing technique that is difficult to master due to its complexities, and success with this method is generally reserved for only the most experienced fishermen.

As the cut plug bait is pulled through the water, it deteriorates over time. To extend bait longevity, some fishermen use bait protector "heads" that are known in the art. Two illustrative bait protectors are described in U.S. Pat. No. 4,133,132 ("Ellis") and U.S. Pat. No. 9,044,000 ("Lumsden"). These protectors each have multiple holes in the front face of the protector through which the fishing line can be run; Ellis describes a protector with two holes, and Lumsden describes a protector with three holes. Selection of the hole to use for the fishing line affects the rate and type of spin of the bait. While these protectors offer some adjustability via the selection of hole to use for the fishing line, changing the location of the line entry with either of these two protectors requires a cumbersome, lengthy, and potentially frustrating process. Adjusting the line to a different hole with existing protectors requires the angler to: (1) cut their line, (2) remove and discard their bait, (3) re-insert the line through a different hole in the front face of the protector, (4) retie their hooks, (5) replenish their bait, (6) re-cut their bait, (7) insert the new bait into the head, and (8) prepare it for fishing. Even one restringing can cause significant damage to the bait, causing most fishermen to pass altogether on any adjustments. There are no known bait protectors that enable rapid adjustments with little to no damage to the baitfish.

For at least the limitations described above there is a need for a rapidly adjustable bait protector.

BRIEF SUMMARY OF THE INVENTION

One or more embodiments described in the specification are related to a rapidly adjustable bait protector. Embodiments of the invention may be used to hold and protect bait fish, and to configure the presentation and movement characteristics of the baitfish. These characteristics may be rapidly adjustable so that the fisherman can modify the characteristics of the bait as desired without rerigging the bait entirely.

In one or more embodiments, the rapidly adjustable bait protector may include a cup configured to receive a front portion of a bait fish, the cup including a front face and a tubular element coupled to the front face at the tubular element front end, and open at the tubular element back end to receive the front portion of the bait fish. The front face may have a plurality of plug holes connected by a plurality of slots; each plug hole of the plurality of plug holes may be connected to each other plug hole by a path through the plurality of slots and the plurality of plug holes. The bait protector may include a plug configured to be removably inserted into any plug hole of the plurality of plug holes. The plug may have a line hole passing through the plug and configured to receive a fishing line inserted through the line hole and passing through the front face to couple the fishing line to one or more hooks. The plug may be configured to be moved from a first plug hole of the plurality of plug holes to a second plug hole of the plurality of plug holes without uncoupling the fishing line from the one or more hooks and without moving the one or more hooks, by removing the plug from the first plug hole without removing the fishing line from the line hole, by sliding the plug up along the fishing line, by sliding the fishing line along one or more slots of the plurality of slots to the second plug hole, and by inserting the plug into the second plug hole by sliding the plug back down along the fishing line.

In one or more embodiments the plurality of plug holes may include four or more plug holes.

In one or more embodiments the plurality of plug holes may include seven or more plug holes.

In one or more embodiments the plurality of plug holes may include three or more columns of plug holes, wherein each column of the three or more columns includes two or more plug holes.

In one or more embodiments the plurality of plug holes may include: a center plug hole at or proximal to a center of the front face; a center-left plug hole offset left from the center plug hole; a center-right plug hole offset right from the center plug hole; a top-center plug hole offset up from the center plug hole; and a bottom-center plug hole offset down from the center plug hole. In one or more embodiments the plurality of plug holes may further include: a top-left plug hole offset left from the top-center plug hole; and a top-right plug hole offset right from the top-center plug hole.

In one or more embodiments the distance between the tubular element front end and the tubular element back end may be at least 20 millimeters.

In one or more embodiments the plug may be associated with a minimum plug diameter; each slot of the plurality of slots may be associated with a slot width; and the slot width associated with each slot may be smaller than the minimum plug diameter.

In one or more embodiments the front face may further include a pair of tuning wire holes configured to receive and secure a tuning wire that shapes an orientation of the bait fish.

In one or more embodiments the pair of tuning wire holes may be located proximal to a bottom edge of the front face.

In one or more embodiments the tubular element may include a pair of bait holder holes configured to receive one or more bait holders to be inserted into the bait fish to hold the bait fish in the tubular element.

In one or more embodiments a first bait holder hole of the pair of bait holder holes may be located on a top of the tubular element; and a second bait holder hole of the pair of bait holder holes may be located on a bottom of the tubular element.

In one or more embodiments, the tubular element may include a line conduit coupled to an inner surface of the tubular element and configured to receive the fishing line; a back edge of the line conduit may include a hook stop configured to hold a front hook in position.

In one or more embodiments the front hook may be an octopus hook and the back edge of the line conduit may be angled to match an angle of the eye of the octopus hook.

One or more embodiments may include a bait spike with a barb end configured to be inserted into the bait fish and an eye coupled to the barb end and configured to receive the fishing line and to hold a back hook near the bait fish without the back hook passing through the bait fish.

BRIEF DESCRIPTION OF THE DRAWINGS

The above and other aspects, features and advantages of the invention will be more apparent from the following more particular description thereof, presented in conjunction with the following drawings wherein:

FIGS. 1A and 1B show front perspective and rear views, respectively, of an illustrative embodiment of a rapidly adjustable bait protector before it is rigged to hold bait.

FIG. 3 shows a back view of the rigged bait protector of FIG. 2A without the bait fish, to show the protector and the installed components.

FIGS. 5A through 5D illustrative steps in adjusting the placement of the fishing line from one hole to another in the embodiment of FIG. 2A.

FIG. 9A shows an illustrative bait spike that may be used with one or more embodiments of the invention. FIG. 9B shows the bait spike placed in a bait fish to hold the back hook without inserting the hook through the bait.

DETAILED DESCRIPTION OF THE INVENTION

Figure 2A:
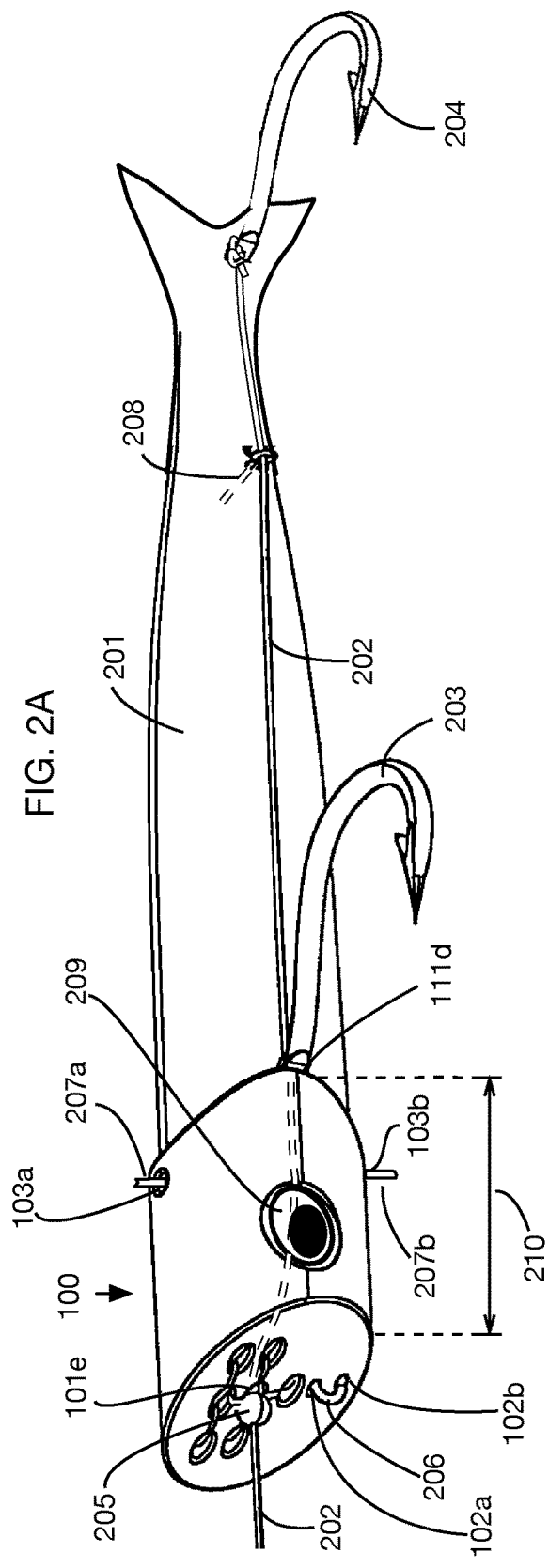
FIG. 2A shows the illustrative embodiment of FIGS. 1A and 1B rigged with bait, line, and hooks.

A rapidly adjustable bait protector will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

FIGS. 1A and 1B show front perspective and rear views, respectively, of an illustrative embodiment of the invention, without a bait fish or fishing line and hooks inserted or attached. An illustrative bait protector has a cup-shaped element 100 with a front face 100a, an open back end 104 into which a bait fish may be inserted, and a tubular element 100b extending from the front face to the open back end. The front face and tubular element may be an integrated component, or they may be manufactured separately and attached. The specific cup shape shown in FIGS. 1A and 1B is illustrative; one or more embodiments may include protector cups of any desired shape. For example, in one or more embodiments the front face 100a need not be flat as it is in FIG. 1A, and the "tubular" shaped side 100b may have any number of straight or curved surfaces that enclose the front sides of the inserted bait.

The illustrative front face 100a has seven plug holes, including for example center plug hole 101e. A plug through which a fishing line passes may be placed in any of these plug holes. The plug hole selected for the fishing line affects the way the bait spins as the line is towed. These plug holes are connected by slots that the fishing line can pass through when moving the line from one plug hole to another, as described below. These slot connections between plug holes allow adjustment of the line hole position without restringing the line, overcoming a major limitation of the prior art. The seven holes also provide for more adjustability than other bait protectors known in the art, which have at most three holes.

Front face 100a also has two tuning wire holes 102a and 102b. These holes are near the bottom edge of the front face. In one or more embodiments these holes may be in any position and orientation. As described below, an optional tuning wire may be bent into a U-shape and inserted into these two holes, and may be used to shape the bait, which also contributes to adjustability of the spin characteristics of the bait.

Tubular element 100b has a top bait holder hole 103a and a corresponding bottom bait holder hole 103b (visible only in FIG. 1B) that may be used for bait holders (such as toothpicks) that secure the bait into the cup 100. In cup 100, top bait holder hole 103a is aligned vertically above bottom bait holder hole 103b, which may simplify insertion of a bait holder (such as a toothpick) into one hole, through the bait, and out through the other hole. In one or more embodiments these bait holder holes may be in any position and orientation.

The visible side of tubular element 100b in FIG. 1A shows an indentation 105 (which is not a hole) which may be used for an eye decal or other pattern or color to make the bait more closely resemble a real fish. The opposite side may have a similar indentation.

FIG. 1B shows a view of cup 100 from the back, looking into the open end 104 where bait will be inserted. This view shows interior sides of plug hole 101e and the other plug holes and the slots connecting them, and of bait holder holes 103a and 103b. A tubular tuning wire guide 112 extends from the outer side of tuning wire hole 102a into the interior to guide the initial portion of the tuning wire towards the bait. A fishing line conduit 111 along the interior side has an entry hole 111a leading to a channel 111c that ends in an exit hole 111b; the fishing line may be run through this channel 111c to guide it along the side of the bait protector cup. A front hook may be placed against the angled hook stop 111d at hole 111b, as described below.

FIG. 2A shows cup 100 with bait fish 201 inserted into the open back end, and with the bait rigged with fishing line and hooks. Fishing line 202 is inserted in this example through plug 205, and the plug is inserted in center plug hole 101e.

(The plug may be placed in and shifted to any of the plug holes, as described below). Tuning wire 206 is bent into a U-shape and inserted into tuning wire holes 102a and 102b in the front face of cup 100. (The tuning wire is not visible in FIG. 2A except for the U-shaped portion passing between holes 102a and 102b.) Fishing line 202 runs into channel 111c along the inner side of the cup and front hook 203 is attached to line 202 at the hook stop 111d at the end of this channel. The line continues along the side of the bait and runs through the eye of a bait spike 208 inserted into bait 201, and a back hook 204 is attached to the end of the line so that the back hook trails behind the tail of the bait fish. A toothpick may be broken into two halves 207a and 207b, and these halves may be inserted into bait holder holes 103a and 103b, respectively, in the cup to secure the bait in place. Eye decals such as decal 209 may be placed on the sides of the bait protector cup.

Figure 2B:
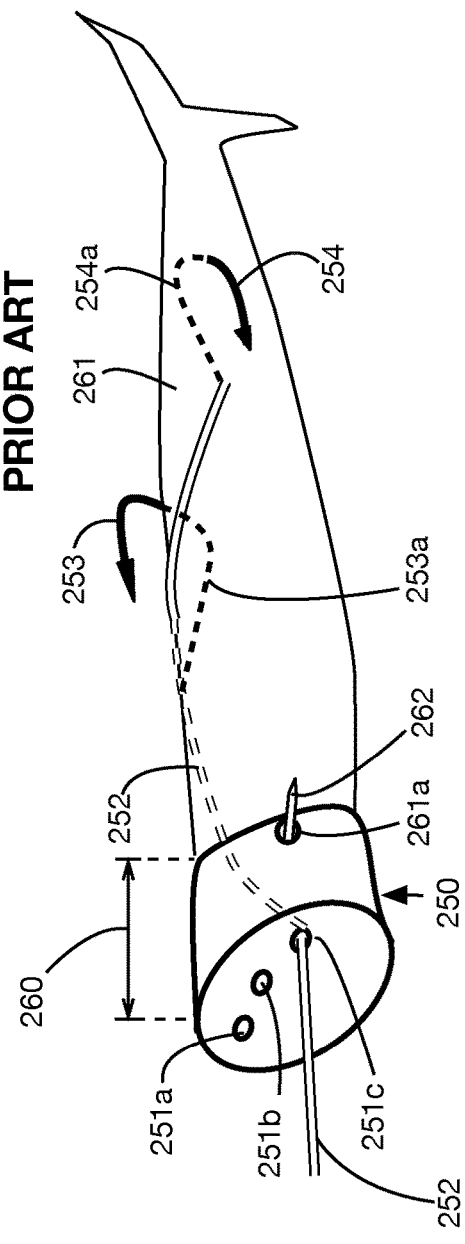
FIG. 2B shows an illustrative bait protector in the prior art.

FIG. 2B shows an illustrative bait protector 250 in the prior art, also rigged with line 252, hooks 253 and 254, and bait 261. Comparing the embodiment of the invention shown in FIG. 2A to this example of the prior art illustrates several benefits of one or more embodiments of the invention:

First, the bait protector cup 100 has a significantly greater depth 210 than the typical depth 260 of bait protector cups in the prior art. (Depth here may be calculated for example as the minimum distance along the tubular element from the front end of the tubular element at the front face of the cup to the back end of the tubular element at the open back side of the cup.) For example, a typical mid-size bait protector 250 in the prior art may have a depth 260 in the range of 13 to 16 millimeters. In comparison, depth 210 of a mid-size embodiment 100 of the invention may be 20 millimeters or greater. In one or more embodiments of the invention, depth 210 may be for example in the range of 23 to 40 millimeters. The greater cup depth 210 of one or more embodiments of the invention allows these embodiments to accommodate larger bait than the prior art. The volume of the cup is significantly larger than that of existing products with similar front face dimension, and this greater volume allows for much more variation in bait size and requires much less skill on the part of the user. It also eliminates the need for precise cuts of the bait. Bait protectors in the prior art require a precise angle of cut so that the bait fits flush against the inner front face of the protector cup. Some anglers purchase or make their own specialized miter boxes to duplicate successful cuts. Embodiments of the invention may be used without a precise cut, or even without any cut: whole bait including the head may be used with the deeper cup of these embodiments. Without the need for a precision cut, cutting of bait may be desirable only to achieve the desired size or length of the bait based on the intended catch. In addition, the deeper cup provided by embodiments of the invention protects the bait more completely, so that the bait deteriorates less as it moves through the water; this enhanced protection also enables moving at faster speeds without destroying the bait.

Second, embodiments of the invention provide more adjustability and easier adjustment for the line position through the face of the bait protector. Illustrative prior art protector 250 has only three holes 251a, 251b, and 251c for the line 252; moving the line from one hole to another requires a complete rerigging, which damages the bait and is time consuming. In contrast, bait protector cup 100 has seven holes and the slots and plug enable rapid adjustment without rerigging. (These additional holes and slots also increase scent dispersal compared to products with fewer holes, increasing the attractiveness of the bait to the fish.) Embodiment 100 also has a tuning wire for further adjustment of the bait presentation and spin characteristics, which can be performed without any damage to the bait or rerunning of the line or hooks. Other products have no such feature; fisherman may improvise bait shape adjustments with toothpicks, but these are a blunt solution, and they damage the bait as they are inserted, removed, and replaced to determine the optimal bait shape.

Third, bait protectors known in the art typically require that front hook 253 and back hook 254 be inserted through the bait. For example, in the example shown in FIG. 2B, front hook 253 has dotted portion 253a running through the bait, and bait hook has dotted portion 254a running through the bait. Placing the hooks directly in the bait damages the bait and limits bait longevity, and it requires more preparation time from the fisherman. In the embodiment of the invention shown in FIG. 2A, front hook 203 rests against hook stop 111d and is not inserted into the bait. A bait spike 208 is placed in the back of the bait to hold the line attached to the back hook 204; this bait spike enters the bait fish, but it is less damaging than inserting the hook directly into the bait.

Fourth, the bait holder toothpick 262 in the protector of FIG. 2B is inserted through horizontally oriented bait holder holes 261a and a corresponding hole 261b (not visible) on the opposite side of the cup. All existing bait protectors in the prior art have horizontally oriented bait holder holes, and typically a single toothpick is inserted through the entire width of the bait. Because the bait holder holes 261a and 261b are typically not aligned across from one another (they may be offset), it may be difficult to thread the toothpick through one hole and through the bait so that it fits precisely into the other hole. Embodiment 100 on the other hand has vertically oriented and vertically aligned bait holder holes 103a and 103b that may accommodate a variety of techniques with toothpicks to hold the bait, and that may provide stronger holding force than the horizontal holes of the prior art. For example, as shown in FIG. 2A, a single toothpick may be broken in half and each half may be inserted into a corresponding hole to hold the bait from the top and the bottom. Alternatively, because the top and bottom holes are vertically aligned, a single toothpick may be threaded through both holes and through the bait without the difficulty inherent in holders of the prior art that have misaligned holes; the user can insert a toothpick into the top bait holder hole and push it straight down vertically through the bait to have it emerge through the bottom bait holder hole. Finally, the user may use only a single toothpick inserted from either the top or the bottom and not entirely through the bait, since a vertically aligned toothpick can effectively hold the bait even if it does not pass completely through the bait. (With bait holders in the prior art, use of separate toothpick halves in the left and right holes, or of a single toothpick through only one hole, generally does not provide enough holding force, and the toothpicks will pull towards the rear of the bait due to the shorter lateral travel distance.) The vertical bait holder holes of embodiments of the invention provide a larger holding surface area since the baitfish are significantly taller than they are wide. (In an illustrative embodiment of the invention, the toothpick travels 37.5 millimeters vertically through the bait between the top and bottom bait holder holes, which is more than double the distance through the bait of a typical bait holder in the prior art with horizontal bait holder holes, which may be 15.5 millimeters for example.) This vertical insertion provides a better purchase and prevents the bait from being torn from the head on a short strike making the bait last longer and increasing the potential for a follow-up strike.

FIG. 3 shows the bait protector embodiment of FIG. 2A from the back, without the bait fish, to show the components in their installed positions. Line 202 runs through the back end of plug 205 and into hole 111a in conduit 111, through channel 111c in the conduit and out through the eye of front hook 203, and then through the eye of bait spike 208 to back hook 204. Tuning wire 206 runs through tuning wire guide 112 through the bait fish towards the back, and the short end of the tuning wire goes through hole 102b in the front face. Toothpick half 207a goes through top bait holder hole 103a, and toothpick half 207b goes through bottom bait holder hole 103b. (Alternatively, a single toothpick may be inserted through both bait holder holes and through the bait, or through only the top or bottom hole and partially through the bait.)

Figure 4A:
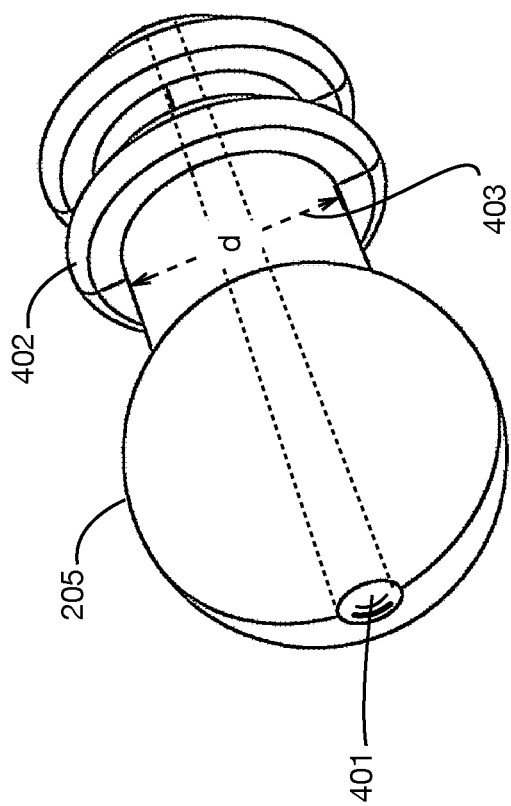
FIG. 4A shows an illustrative shifter plug embodiment that is used for adjusting the position of the line on the bait protector.
Figure 4B:
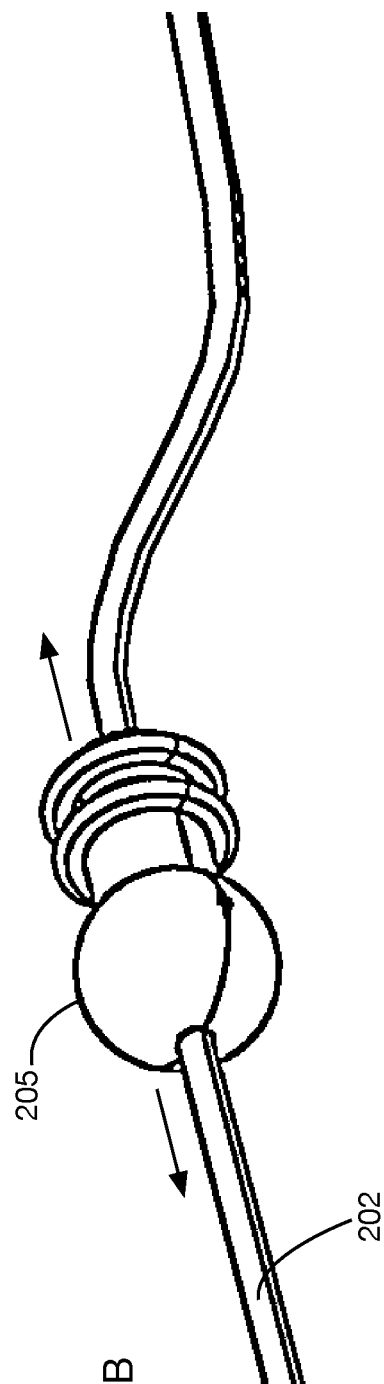
FIG. 4B shows the shifter plug with a fishing line through it.

FIGS. 4A through 6B describe details of the adjustability of the hole position through which the line passes through the front face of the bait protector cup. FIG. 4A shows an illustrative plug 205 through which a fishing line 202 is run, as shown in FIG. 4B. Plug 205 has a line hole 401 running through the plug to accommodate the fishing line. The plug can slide forwards and backwards along the line 202, as shown in FIG. 4B. Plugs may be of any shape, size, and material. Illustrative plug 205 has one or more back flanges 402 that may be flexible to pass through a plug hole and then hold the plug in position from the back side of the front cup face. The central portion of plug 205 that fits through a plug hole has a minimum diameter 403 that may be approximately equal to the diameter of a plug hole.

FIGS. 5A through 5D show steps of an illustrative adjustment of the plug position from one hole to another. This adjustment is a simple and rapid procedure and does not require removal or rerigging of the fishing line, bait, or hooks. In FIG. 5A plug 205 is initially in the center hole 101e, and line 202 runs through the hole in the plug to enter the interior of the bait protector cup 100. The fisherman wants to move the line entry position to hole 101d. To achieve this adjustment, in the first step shown in FIG. 5B, plug 205 is pulled out of hole 101e and slid forward along line 202. FIG. 5C shows the next step of sliding the line 202 along the slot that connects hole 101e and hole 101d. When the line reaches hole 101d, the final step as shown in FIG. 5D is to push the plug 205 back along line 202 into the new hole 101d. The adjustment is now complete.

Figure 6B:
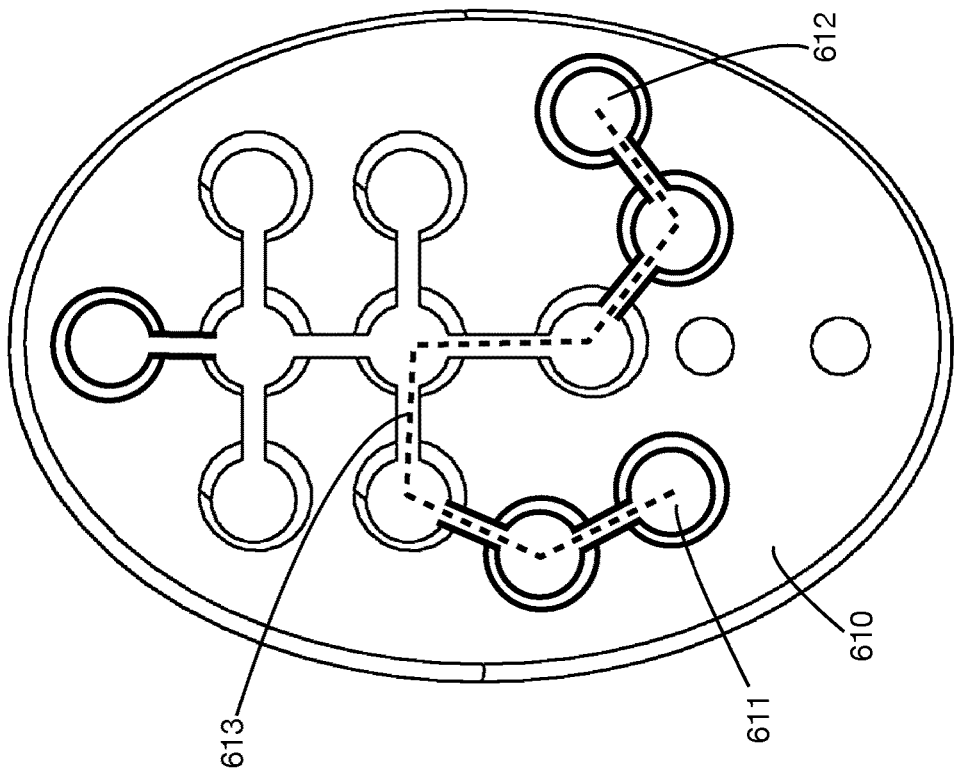
FIG. 6B shows another embodiment of the invention with a different hole pattern.
Figure 6A:
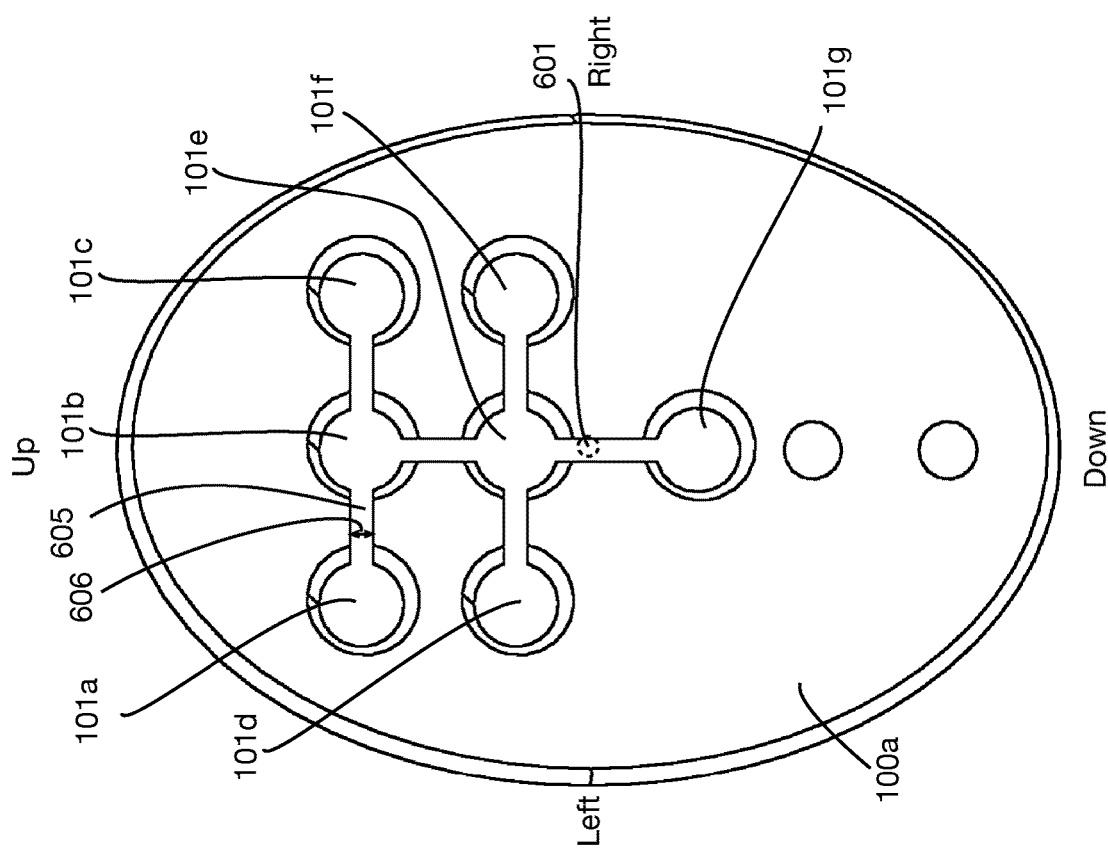
FIG. 6A shows the front face of the embodiment of FIG. 1A, illustrating 7 different holes that the fishing line can go through and the channels between these holes for adjusting the line.

FIG. 6A shows a closeup view of the hole and slot pattern in front face 100a of illustrative bait protector cup 100. Illustrative face 100a has seven holes 101a through 101g arranged in three rows and three columns; the center column has three plug holes and the left and right columns have two plug holes each. Face 100a is approximately oval-shaped, with a center point 601, a left-to-right axis along the minor axis of the oval, and an up-down axis along the major axis of the oval. In this embodiment, the plug holes in the face include a center plug hole 101e that is near (or at) center point 601, a center-left plug hole 101d offset left from 101e, a center-right plug hole 101f offset right from 101e, a top-center plug hole 101b offset up from 101e, a top-left plug hole 101a offset left from 101b, a top-right plug hole 101c offset right from 101b, and a bottom-center plug hole 101g offset down from 101e.

The hole in which the plug is placed (and thus through which the fishing line enters the bait protector cup) affects the type of movement of the bait as it is towed through the water. Plug placement in the top row (holes 101a, 101b, 101c) causes faster spins, while lower placement causes slower spins. Placement in center plug hole 101e causes a tight, bullet-type spin. Placement in top-right plug hole 101c causes a larger tail arc or "chopper" roll. Placement in center-right hole slows down the spin but a larger tail arc is preserved. Placement in top-left hole 101a causes a larger circumference with a faster roll. With the large number of hole placement options, the fisherman can select and modify the hole to make the spin tight or loose, fast or slow, and to enable varying degrees of wobble. In contrast, bait protectors known in the art provide a much narrower range of options and are limited to wide-arc "chopper" spins.

Between plug holes 101a through 101g are several connecting slots, such as slot 605 between top-center plug hole 101b and top-left plug hole 101a. Each slot is wide enough that a fishing line 202 can slide along the slot, but not wide enough for the plug 205 to slide along the slot. Specifically, the minimum diameter 403 of plug 205 (as shown in FIG. 4A) is greater than the width of each slot, such as the width 606 of slot 605. This ensures that the plug does not inadvertently move along a slot from one plug hole to another without the procedure shown in FIGS. 5A to 5D being performed to explicitly change the hole.

The pattern of holes and slots illustrated in FIG. 6A allows the fishing line to be moved from any plug hole to any other plug hole by sliding it through one or more slots and holes. The open region in the face 100a consisting of slots and plug holes is therefore a connected region. One or more embodiments of the invention may have any pattern of plug holes and slots that also forms such a connected region, so that the line can be moved from one plug hole to another without restringing the line. FIG. 6B shows another illustrative embodiment 610 of a cup front face with four plug holes and four slots in addition to those of the embodiment of FIG. 6A. The pattern of plug holes and slots in face 610 also has the property that it forms a connected region. As an example, a plug may be moved from plug hole 612 to plug hole 611 by sliding the line along path 613.

Figure 7A:
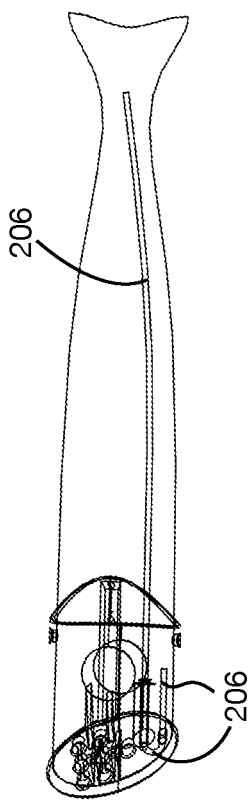
FIGS. 7A through 7F show different illustrative adjustments of a tuning wire inserted through the protector that shapes the bait fish in different orientations.
Figure 7B:
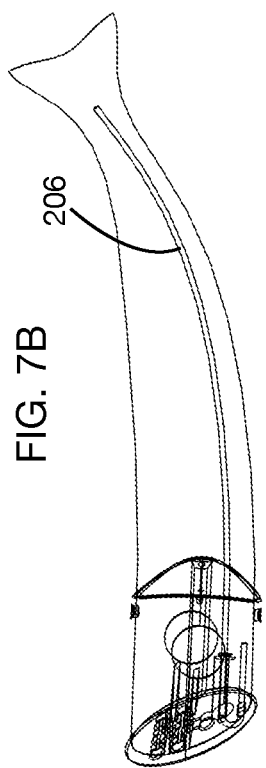
Figure 7C:
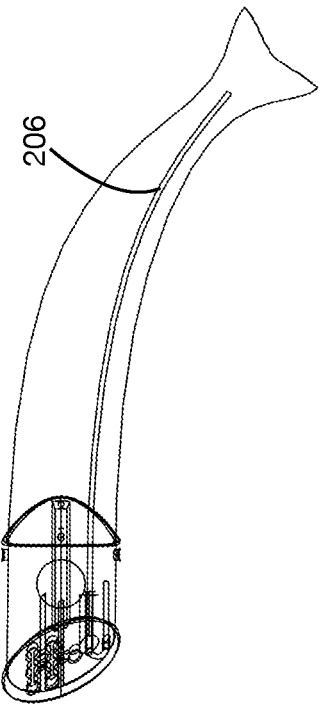
Figure 7D:
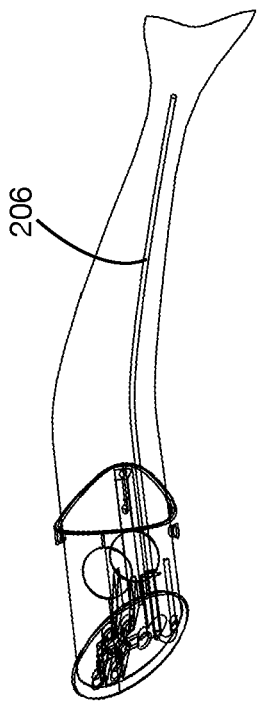
Figure 7E:
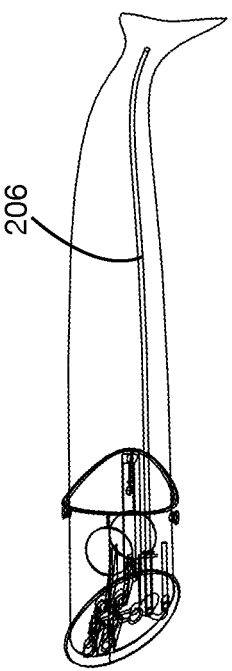
Figure 7F:
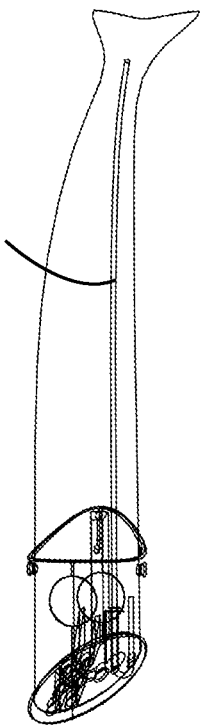

As shown in FIG. 3, a bendable tuning wire 206 may be inserted through tuning wire holes in the front face of the bait protector cup. The long end of the tuning wire may be inserted into the bait, potentially along the entire length of the bait. The shape of the bait may be modified by bending the wire inside the bait body to create various changes that can change the spinning and swimming action of the bait. For example, bending the bait tail upward may increase the spin rate of the bait, and bending the tail downwards may decrease the spin rate. The tuning wire is not permanently attached to the bait protector, so a user has an option to not use a tuning wire at all. FIGS. 7A through 7F show several illustrative tuning wire shapes to show how the bait shape can be manipulated. A fisherman can change from any of these shapes to any other shape without removing or reinserting the tuning wire. These figures are shown as wireframe views to show the location of the tuning wire through the bait and through the protector cup. FIG. 7A shows a largely straight tuning wire. FIG. 7B shows a tail bent up shape, and FIG. 7C shows a tail bent down shape. FIGS. 7D through 7F show sideways bends: FIG. 7D shows a gill bend; FIG. 7E shows a tail bend; and FIG. 7F shows a C-bend. All these shapes are illustrative, and they can be combined and modified in any desired manner.

Figure 8A:
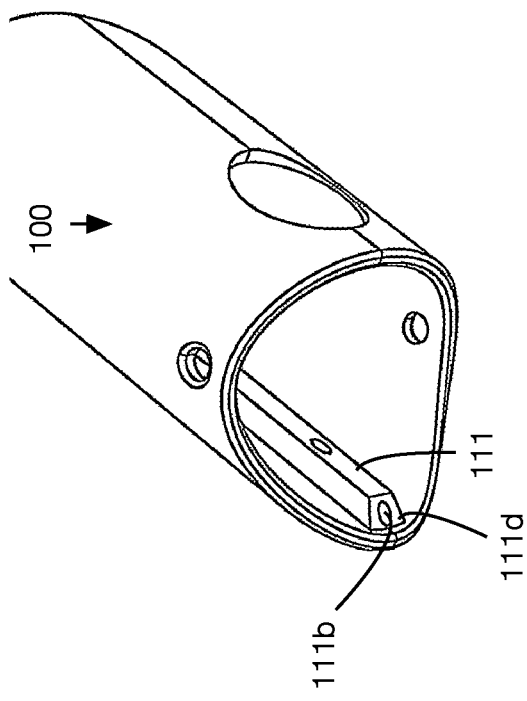
FIG. 8A shows a closeup view of a front hook stop integrated into the embodiment of FIG. 1A.
Figure 8B:
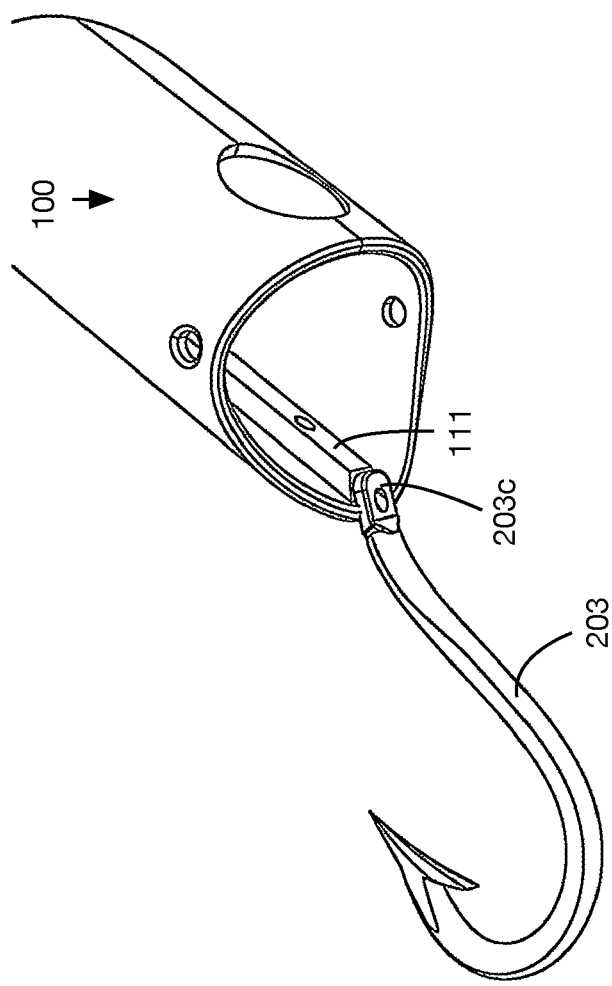
FIG. 8B shows an octopus hook placed against this hook stop.

FIG. 8A shows a closeup view of the beveled back side 111d of fishing line conduit 111 in the interior of bait protector cup 100. The angle of this side matches the angle of a standard and commonly used octopus hook. As shown in FIG. 8B, this angle allows an octopus hook 203 to rest directly against the hook stop formed by beveled side 111d.

This seats the front hook 203 in strike position (as shown in FIG. 8B), without requiring burying of the hook in the bait.

FIG. 9A shows a view of an illustrative bait spike 208 that may be used in one or more embodiments of the invention. Bait spike 208 has a barbed end 208a and an eye 208b. The barbed end 208a may be inserted for example near the back end of the bait, as shown in FIG. 9B, and fishing line 202 may be run through eye 208, to secure back hook 204 in position. This keeps the hook near the bait even as the bait spins around. It eliminates the need to place the back hook 204 into the bait, which reduces damage to the bait, improves bait presentation, and extends bait life.

While the invention herein disclosed has been described by means of specific embodiments and applications thereof, numerous modifications and variations could be made thereto by those skilled in the art without departing from the scope of the invention set forth in the claims.

What is claimed is:

1. A rapidly adjustable bait protector comprising:
   a cup configured to receive a front portion of a bait fish, said cup comprising a front face; and a tubular element coupled to said front face at a tubular element front end, and open at a tubular element back end to receive said front portion of said bait fish;
   wherein said front face comprises a plurality of plug holes connected by one or more slots;
   each plug hole of said plurality of plug holes is connected to each other plug hole of said plurality of plug holes by a path through said one or more slots and said plurality of plug holes,
   wherein a diameter of said each plug hole is greater than a width of each slot of said one or more slots in a transverse direction of said one or more slots relative to a longitudinal direction of said one or more slots;
   a plug configured to be removably inserted into any plug hole of said plurality of plug holes, comprising a line hole passing through said plug and configured to receive a fishing line inserted through said line hole and passing through said front face to couple said fishing line to one or more hooks;
   wherein said plug is configured to be moved from a first plug hole of said plurality of plug holes to a second plug hole of said plurality of plug holes without uncoupling said fishing line from said one or more hooks and without moving said one or more hooks, by
   removing said plug from said first plug hole without removing said fishing line from said line hole, by sliding said plug along said fishing line;
   sliding said fishing line along said one or more slots to said second plug hole; and,
   inserting said plug into said second plug hole by sliding said plug along said fishing line;
   wherein said plurality of plug holes are at different locations on said front face and comprise a center plug hole at or proximal to a center of said front face, and additional plug holes offset from and connected to said center plug hole,
   wherein said center plug hole and said additional plug holes comprise said first plug hole, said second plug hole and at least a third plug hole;
   wherein said plurality of plug holes are arranged in a pattern such that the path connects said first plug hole and said second plug hole to said third plug hole via said one or more slots;
   wherein at least said first plug hole, said second plug hole and said third plug hole are connected to each other via said path;
   wherein said fishing line is restricted by said path wherein said fishing line is configured to move in said one or more slots without uncoupling the fishing line and without removing the fishing line from the line hole; and
   wherein said fishing line in said plug is configured to pull the cup from a plurality of locations offset from one another on said front face of said cup that correspond to said plurality of plug holes to create a plurality of spin rates and a plurality of arc circumferences.

2. The rapidly adjustable bait protector of claim 1, wherein said plurality of plug holes comprises four or more plug holes.

3. The rapidly adjustable bait protector of claim 1, wherein said plurality of plug holes comprises seven or more plug holes.

4. The rapidly adjustable bait protector of claim 1, wherein said plurality of plug holes comprises
   three or more columns of plug holes, wherein each column of said three or more columns comprises two or more plug holes.

5. The rapidly adjustable bait protector of claim 1, wherein said additional plug holes comprise
   a center-left plug hole offset left from said center plug hole;
   a center-right plug hole offset right from said center plug hole;
   a top-center plug hole offset up from said center plug hole; and
   a bottom-center plug hole offset down from said center plug hole.

6. The rapidly adjustable bait protector of claim 5, wherein said additional plug holes further comprise
   a top-left plug hole offset left from said top-center plug hole; and,
   a top-right plug hole offset right from said top-center plug hole.

7. The rapidly adjustable bait protector of claim 5, wherein each location of said different locations of said plurality of plug holes is configured to enable a spin comprising different spin characteristics of said bait fish as said bait fish is towed through water, wherein
   said plug inserted into said top-center plug hole causes said spin to be fast,
   said plug inserted into said bottom-center plug hole causes said spin to be slow,
   said plug inserted into said center plug hole causes said spin to be a bullet-type spin,
   said plug inserted into said center-right plug hole causes said spin to slow down with a large tail arc.

8. The rapidly adjustable bait protector of claim 1, wherein a distance between said tubular element front end and said tubular element back end comprises at least 20 millimeters.

9. The rapidly adjustable bait protector of claim 1, wherein
   said plug is associated with a minimum plug diameter; and,
   wherein said width of said each slot is smaller than said minimum plug diameter.

10. The rapidly adjustable bait protector of claim 1, wherein
    said front face further comprises a pair of tuning wire holes configured to receive and secure a tuning wire that shapes an orientation of said bait fish.

11. The rapidly adjustable bait protector of claim 10, wherein said pair of tuning wire holes are located proximal to a bottom edge of said front face.

12. The rapidly adjustable bait protector of claim 1, wherein
said tubular element comprises a pair of bait holder holes configured to receive one or more bait holders to be inserted into said bait fish to hold said bait fish in said tubular element.

13. The rapidly adjustable bait protector of claim 11, wherein
a first bait holder hole of said pair of bait holder holes is located on a top of said tubular element; and,
a second bait holder hole of said pair of bait holder holes is located on a bottom of said tubular element.

14. The rapidly adjustable bait protector of claim 1, wherein said tubular element comprises
a line conduit coupled to an inner surface of said tubular element and configured to receive said fishing line;
wherein a back edge of said line conduit comprises a hook stop configured to hold a front hook of said one or more hooks in position.

15. The rapidly adjustable bait protector of claim 14, wherein
said front hook is an octopus hook; and,
said back edge of said line conduit is angled to match an angle of an eye of said octopus hook.

16. The rapidly adjustable bait protector of claim 1, further comprising a bait spike comprising
a barb end configured to be inserted into said bait fish; and
an eye coupled to said barb end and configured to receive said fishing line and to hold a back hook of said one or more hooks near said bait fish without said back hook passing through said bait fish.

17. A rapidly adjustable bait protector comprising:
a cup configured to receive a front portion of a bait fish, said cup comprising a front face; and a tubular element coupled to said front face at a tubular element front end, and open at a tubular element back end to receive said front portion of said bait fish;
wherein a distance between said tubular element front end and said tubular element back end comprises at least 20 millimeters;
said front face comprises
a plurality of plug holes connected by one or more slots;
a pair of tuning wire holes configured to receive and secure
a tuning wire that shapes an orientation of said bait fish;
a pair of bait holder holes configured to receive one or more bait holders to be inserted into said bait fish to hold said bait fish in said tubular element, said pair of bait holder holes comprising
a first bait holder hole located on a top of said tubular element; and
a second bait holder hole located on a bottom of said tubular element;
a line conduit coupled to an inner surface of said tubular element and configured to receive a fishing line passing through said front face and coupled to one or more hooks,
wherein a back edge of said line conduit comprises a hook stop configured to hold a front hook of said one or more hooks in position;
said front hook comprises an octopus hook; and
said back edge of said line conduit is angled to match an angle of an eye of said octopus hook;

each plug hole of said plurality of plug holes is connected to each other plug hole of said plurality of plug holes by a path through said one or more slots and said plurality of plug holes,
wherein a diameter of said each plug hole is greater than a width of each slot of said one or more slots in a transverse direction of said one or more slots relative to a longitudinal direction of said one or more slots;
a plug configured to be removably inserted into any plug hole of said plurality of plug holes, comprising a line hole passing through said plug and configured to receive said fishing line inserted through said line hole; and,
a bait spike comprising a barb end configured to be inserted into said bait fish; and an eye coupled to said barb end and configured to receive said fishing line and to hold a back hook of said one or more hooks near said bait fish without said back hook passing through said bait fish;
wherein said plug is configured to be moved from a first plug hole of said plurality of plug holes to a second plug hole of said plurality of plug holes without uncoupling said fishing line from said one or more hooks and without moving said one or more hooks, by
removing said plug from said first plug hole without removing said fishing line from said line hole, by sliding said plug along said fishing line;
sliding said fishing line along said one or more slots to said second plug hole; and,
inserting said plug into said second plug hole by sliding said plug along said fishing line;
wherein said plurality of plug holes are at different locations on said front face and comprise a center plug hole at or proximal to a center of said front face, and additional plug holes offset from and connected to said center plug hole,
wherein said center plug hole and said additional plug holes comprise said first plug hole, said second plug hole and at least a third plug hole;
wherein said plurality of plug holes are arranged in a pattern such that the path connects said first plug hole and said second plug hole to said third plug hole via said one or more slots;
wherein at least said first plug hole, said second plug hole and said third plug hole are connected to each other via said path;
wherein said path is restricted by said fishing line that is configured to move in said one or more slots without uncoupling the fishing line and without removing the fishing line from the line hole; and
wherein said fishing line in said plug is configured to pull the cup from a plurality of locations offset from one another on said front face of said cup that correspond to said plurality of plug holes to create a plurality of spin rates and a plurality of arc circumferences.

18. The rapidly adjustable bait protector of claim 1, wherein each location of said different locations of said each plug hole of said plurality of plug holes enables different movement characteristics of said rapidly adjustable bait protector as desired when said fishing line is slid along said one or more slots and when said plug is inserted into said each plug hole of said plurality of plug holes.

19. The rapidly adjustable bait protector of claim 17, wherein each location of said different locations of said each plug hole of said plurality of plug holes enables different movement characteristics of said rapidly adjustable bait protector as desired when said fishing line is slid along said one or more slots and when said plug is inserted into said each plug hole of said plurality of plug holes.

20. The rapidly adjustable bait protector of claim 17, wherein each location of said different locations of said plurality of plug holes is configured to enable a spin comprising different spin characteristics of said bait fish as said bait fish is towed through water, wherein
- said plug inserted into said center plug hole at or proximal to said center of said front face causes said spin to be a bullet-type spin,
- said plug inserted into a top-center plug hole offset up from said center of said front face causes said spin to be fast,
- said plug inserted into a bottom-center plug hole offset down from said center of said front face causes said spin to be slow,
- said plug inserted into a center-right plug hole offset right from said center of said front face causes said spin to slow down with a large tail arc.

* * * * *